(12) United States Patent
Sunagawa et al.

(10) Patent No.: US 6,519,387 B1
(45) Date of Patent: Feb. 11, 2003

(54) IMAGE RECORDING DEVICE AND OPTICAL FIBER

(75) Inventors: Hiroshi Sunagawa, Kanagawa (JP); Shizuo Umemura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/560,295

(22) Filed: Apr. 27, 2000

(30) Foreign Application Priority Data

Apr. 27, 1999 (JP) ............................................ 11-120291
Apr. 27, 1999 (JP) ............................................ 11-120585

(51) Int. Cl.[7] ................................................ G02B 6/32
(52) U.S. Cl. ............................. 385/33; 385/85; 385/89; 385/124; 347/225
(58) Field of Search ............................. 385/33, 34, 89, 385/85, 124; 347/225, 256

(56) References Cited

U.S. PATENT DOCUMENTS

| 5,268,978 A | 12/1993 | Po et al. ........................ 385/33 |
| 5,373,576 A | 12/1994 | Minns et al. ................. 385/125 |
| 5,521,999 A | * 5/1996 | Chuang et al. ................ 385/33 |
| 5,592,333 A | * 1/1997 | Lewis ......................... 359/628 |

FOREIGN PATENT DOCUMENTS

| JP | 7-276701 | 10/1995 | .............. B41J/2/44 |
| WO | 97/27065 | 7/1997 | ............ B41N/1/08 |

* cited by examiner

*Primary Examiner*—Cassandra Spyrou
*Assistant Examiner*—Fayez Assaf
(74) *Attorney, Agent, or Firm*—Sughrue Mion, PLLC (57) ABSTRACT

An image recording device and an optical fiber are provided which can obtain scanned beam spots having configurations which extend in an elongated manner in a subscanning direction and which are rectangular, and which are suitably used for recording onto a heat-mode-type photosensitive recording material. The image recording device records an image by illuminating a light beam outputted from an exposure head which is connected to a semiconductor laser unit via an optical fiber. In the image recording device, the optical fiber is an optical fiber having a core whose cross-sectional configuration in a direction intersecting an optical axis of the light beam is an elongated and a rectangular configuration. An image is focused by a focusing lens such that a short width direction of a light beam emitted from a light exit portion of the optical fiber is oriented in a main scanning direction on a recording medium.

15 Claims, 12 Drawing Sheets

MAIN SCANNING DIRECTION

IMAGE RECORDING DEVICE AND OPTICAL FIBER

BACKGROUND OF THE INVENTION

1. Field of the Invention

The present invention relates to an image recording device and to an optical fiber, and in particular, to an image recording device which records an image onto a recording medium by main scanning and subscanning a light beam onto the recording medium by relatively moving the light beam and the recording medium, and to an optical fiber used in the image recording device.

2. Description of the Related Art

Conventional image recording devices have been known in which a laser beam outputted from a light source such as a laser is inputted to an optical fiber. The light emitted from the optical fiber is collected by a lens. While a drum, on whose outer peripheral surface a recording medium is set, is rotated in a main scanning direction, the collected light beam is scanned in the subscanning direction which is orthogonal to the main scanning direction. In this way, the image is recorded onto the recording medium which is disposed at the focal point position of the lens. For example, WO 97/27065 discloses an image recording device in which light emitted from an optical fiber array, to which infrared lasers are inputted, is focused on a drum by a telecentric lens optical system, so as to record an image. In these image recording devices, a usual optical fiber having a core/clad structure having a core of a circular cross-sectional configuration is used. The profile of the light emitted from an optical fiber having a core of a circular cross-sectional configuration is circular, and the spot configuration of the beam scanned on the recording material is also circular.

However, by carrying out exposure at a high illumination intensity and in a short time, in order to reduce the energy used for exposure, it is preferable for the spot configuration of the scanned beam to be, rather than circular, short in the main scanning direction.

Further, by making the light intensity substantially constant in the widthwise direction, variations in the widths of the written lines, which variations are caused by variations in the amount of light, can be suppressed. A stable, good image can thereby be obtained. Therefore, it is preferable that the spot configuration of the scanned beam is rectangular or the like, rather than circular.

A scanned beam spot having an elongated configuration or a rectangular configuration can be obtained by using as a light source a broad-area-type semiconductor laser (with which the profile of the emitted light is an elongated configuration or a rectangular configuration). A broad-area-type semiconductor laser is high output, and is effective for applications requiring a high output light source, such as the recording of images onto a heat-mode-type photosensitive recording material. However, because the light source is high output, much heat is generated. In cases in which light sources are disposed in an array, cooling thereof is difficult. Further, when a semiconductor laser is built-in into the optical unit of an image recording device as the output source of the scanning beam, a problem arises in that, when the semiconductor laser malfunctions, it is troublesome to replace the semiconductor laser with a new one.

Japanese Patent Application Laid-Open (JP-A) No. 7-276701 discloses an image recording device which carries out recording by laser light outputted from an optical fiber which is formed such that the output end portion thereof is shaped to have a flat surface in the vertical direction. The object of the invention of JP-A-7-276701 is to obtain pixels having no convexities nor concavities, by forming the optical fiber to have a flat surface in the vertical direction at the output end portion of the optical fiber. However, the drawings of JP-A-7-276701 only illustrate an optical fiber having an external configuration in which a circular-tube-shaped fiber is flattened midway along the fiber, and JP-A-7-276701 does not clearly disclose the material, refractive index, or structure of the optical fiber. Thus, it can only be concluded that this device utilizes a single-composition optical fiber having a uniform refractive index. With such an optical fiber, there are the problems that the light propagation loss is great and the efficiency of utilizing the light beam is markedly low. Further, an optical fiber whose shape is flattened midway along the fiber has the problem that production thereof is difficult because the produceability and reproducibility of the optical fibers is poor.

As described above, it has until now not been possible to realize an image recording device which can obtain a beam spot having an elongated configuration in the subscanning direction or a beam spot having a rectangular configuration by using an optical fiber.

SUMMARY OF THE INVENTION

The present invention was developed in consideration of the above-discussed problems with conventional image recording devices, and an object of the present invention is to provide an image recording device in which a beam spot of a configuration which extends in an elongated manner in the subscanning direction or a beam spot of a rectangular configuration can be obtained, and which can be suitably used in recording onto heat-mode-type photosensitive recording materials. Further, another object of the present invention is to provide an image recording device in which, even if the amount of light or the sensitivity of the recording material or the like varies, a stable, good image can be obtained, and which has a low propagation loss, can be manufactured easily, and is practical.

The present inventors conducted experiments in order to overcome the above-discussed problems, and as a result, overcame the above problems by the following means.

A first aspect of the present invention is an image recording device for recording an image on a recording medium by main scanning and subscanning a light beam with respect to the recording medium by relatively moving the light beam and the recording medium, comprising a light source which emits a laser beam which has been modulated in accordance with image data; an optical fiber having a core, a clad covering the core, a light exit portion, and a light entry portion optically joined to the light source, which receives the laser beam into the optical fiber, the core having a cross-sectional configuration in a plane substantially orthogonal to an optical axis direction of the laser beam corresponding to at least one of an elongated configuration and a configuration having two parallel sides at least at the light exit portion of the optical fiber; and a focusing lens which focuses, on the recording medium, a light beam emitted from the light exit portion of the optical fiber.

A second aspect of the present invention is the image recording device of the first aspect, wherein the focusing lens focuses the laser beam on the recording medium such that a configuration of the laser beam on the recording medium is the elongated configuration and the elongated configuration includes a short dimension oriented in a direction coinciding with a direction in which the main scanning is conducted.

A third aspect of the present invention is the image recording device any one of the first aspect and the second aspect, wherein the cross-section of the core is the elongated configuration and the elongated configuration includes a short dimension oriented in a direction coinciding with a direction in which the main scanning is conducted.

A fourth aspect of the present invention is the image recording device of the first aspect, wherein the cross-section of the core is configuration having two parallel sides, and the focusing lens focuses the laser beam on the recording medium such that a light intensity of the light beam emitted from the light exit portion of the optical fiber is substantially same at least one of in a direction in which the main scanning is conducted and in a direction in which the sub scanning is conducted.

A fifth aspect of the present invention is the image recording device any one of the first to forth aspects, wherein the recording medium is a heat-mode-type photosensitive recording material.

A sixth aspect of the present invention is the image recording device any one of the first to fifth aspects, wherein the light source is a broad-area-type semiconductor laser.

A seventh aspect of the present invention is an optical fiber for transmitting a light beam, comprising: a core having a light entry portion for receiving a light beam therein a light exit portion and a cross-sectional configuration in a plane substantially orthogonal to an optical axis direction of the light beam being at least one of an elongated configuration and a configuration having two parallel sides at least at the light exit portion; and a clad covering the core.

An eighth aspect of the present invention is the optical fiber of the seventh aspect, wherein an exit light beam emitted from the light exit portion of the optical fiber having a light intensity distribution in one of directions substantially orthogonal to the optical axis direction is a single-mode distribution.

A ninth aspect of the present invention is the image recording device any one of the first to sixth aspects, wherein an exit light beam emitted from the light exit portion of the optical fiber having a light intensity distribution in a direction in which the main scanning is conducted is a single-mode distribution.

A tenth aspect of the present invention is the image recording device any one of the first to sixth and ninth aspects, wherein the optical fiber is formed from at least two optical fibers, and the at least two optical fibers are disconnectably joined by a joining member which is provided with positioning means at peripheries of the optical fibers for positioning the optical fibers relative to one another according to a predefined orientation.

A eleventh aspect of the present invention is an image recording device which records an image on a recording medium by main scanning and subscanning a light beam with respect to the recording medium by relatively moving the light beam and the recording medium, and in which a plurality of light beams are main scanned in a single main scan, comprising: a plurality of light sources emitting light beams which have been modulated in accordance with image data; an optical fiber array in which a plurality of optical fibers are aligned in an array form such that positions of the optical fibers in a focal point direction are the same, each of the optical fibers including a light entry portion, a light exit portion, and a core, the core having a cross-sectional configuration in a plane substantially orthogonal to an optical axis direction of each of the light beams corresponding to at least one of an elongated configuration and a configuration having two parallel sides at least at the light exit portion of the optical fiber, and each the optical fiber including a clad covering each the core, the plurality of optical fibers being optically joined to the light source; and a focusing lens which focuses, on the recording medium, light beams emitted from the light exit portions of the optical fibers.

A twelfth aspect of the present invention is the image recording device of the eleventh aspect, wherein the focusing lens focuses the laser beam on the recording medium such that a configuration of the laser beam on the recording medium is the elongated configuration and the elongated configuration includes a short dimension oriented in a direction coinciding with a direction in which the main scanning is conducted.

A thirteenth aspect of the present invention is the image recording device any one of the eleventh and twelfth aspects, wherein the cross-section of the core is the elongated configuration and the elongated configuration includes a short dimension oriented in a direction coinciding with a direction in which the main scanning is conducted.

A fourteenth aspect of the present invention is the image recording device of the eleventh aspect, wherein the cross-section of the core is configuration having two parallel sides, and the focusing lens focuses the laser beam on the recording medium such that a light intensity of the light beam emitted from the light exit portion of the optical fiber is substantially same at least one of in a direction in which the main scanning is conducted and in a direction in which the sub scanning is conducted.

A fifteenth aspect of the present invention is the image recording device any one of the eleventh to fourteenth aspects, wherein the plurality of optical fibers are aligned such that no intervals are formed between focused images on the recording material. In accordance with the first aspect of the invention, due to the cross-sectional configuration the core of the light exit portion of the optical fiber being at least one of an elongated configuration and a configuration having two parallel sides, the beam spot formed on the recording medium can also be formed in at least one of an elongated configuration and a configuration having two parallel sides. In the second aspect, a configuration of the laser beam on the recording medium is the elongated configuration and the elongated configuration includes a short dimension oriented in a direction coinciding with a direction in which the main scanning is conducted. As a result, the scanning time is short. Further, a reduction in energy is achieved when a recording material exhibiting low intensity reciprocity law failure is used. Further, by using the optical fiber having the core/clad structure as the light transfer route, the amount of light required for image recording can be obtained with a low propagation loss.

In accordance with the third aspect of the invention, the cross-section of the core is the elongated configuration and the elongated configuration includes a short dimension oriented in a direction coinciding with a direction in which the main scanning is conducted. Thus, a beam spot, whose short dimension direction coincides with the main scanning direction, can be obtained on the recording medium with a simpler lens system.

In accordance with the forth aspect of the invention, the cross-section of the core is configuration having two parallel sides. Thus, the intensity of the light of beam is substantially constant in the widthwise direction. Therefore, even if the light amount or the sensitivity of the recording material or the like varies, there is little variation in the widths of the written lines and in the halftone dot ratio. A good, stable image can therefore be obtained.

Much attention has been paid to heat-mode-type photosensitive recording materials as digital plate-making systems, from the standpoint of writing images directly onto a recording material by a laser. In accordance with the invention of the fifth aspect, by using a low amount of exposure energy, a good image can be obtained on a heat-mode-type photosensitive recording material which exhibits low intensity reciprocity law failure.

In the sixth aspect of the present invention, a high output light beam can be obtained by using a broad-area-type semiconductor laser. Further, because the profile of the emitted light of a broad-area-type semiconductor laser is an elongated configuration or configuration having two parallel sides, the efficiency of light entering into an optical fiber having an elongated core cross-section or configuration having two parallel sides, which is same as the profile of the emitted light of the broad-area-type semiconductor laser, is good.

In accordance with the ninth aspect of the present invention, the spot diameter in the main scanning direction is easy to control by using an optical fiber which emits a light beam having a single-mode main scanning direction light intensity distribution.

In accordance with the tenth aspect of the invention, it is easy to disconnect the light sources and the recording head. Thus, if a light source malfunctions and can no longer be used, the light source can be easily replaced. Further, at the joining means, a positioning means is provided around the optical fiber. Thus, the light exiting end surfaces of the cores of the respective optical fibers can be made to coincide when the optical fibers are joined. Thus, the loss of light due to coupling of the optical fibers can be kept low.

In accordance with the eleventh aspect of the invention, a plurality of light beams can be main scanned in a single main scan, such that the speed of image formation can be increased. Further, the light sources are optically joined to the recording head or the like by the optical fibers whose lengths can be adjusted. Thus, the light sources and the recording head can be disposed apart from one another, which facilitates cooling of the light sources.

In accordance with the fifteenth aspect of the present invention, the configurations of the pixels formed on the recording medium by the scanned beam can be adjusted, such that a better image can be obtained.

DESCRIPTION OF THE PREFERRED EMBODIMENTS

First Embodiment

Figure 1:
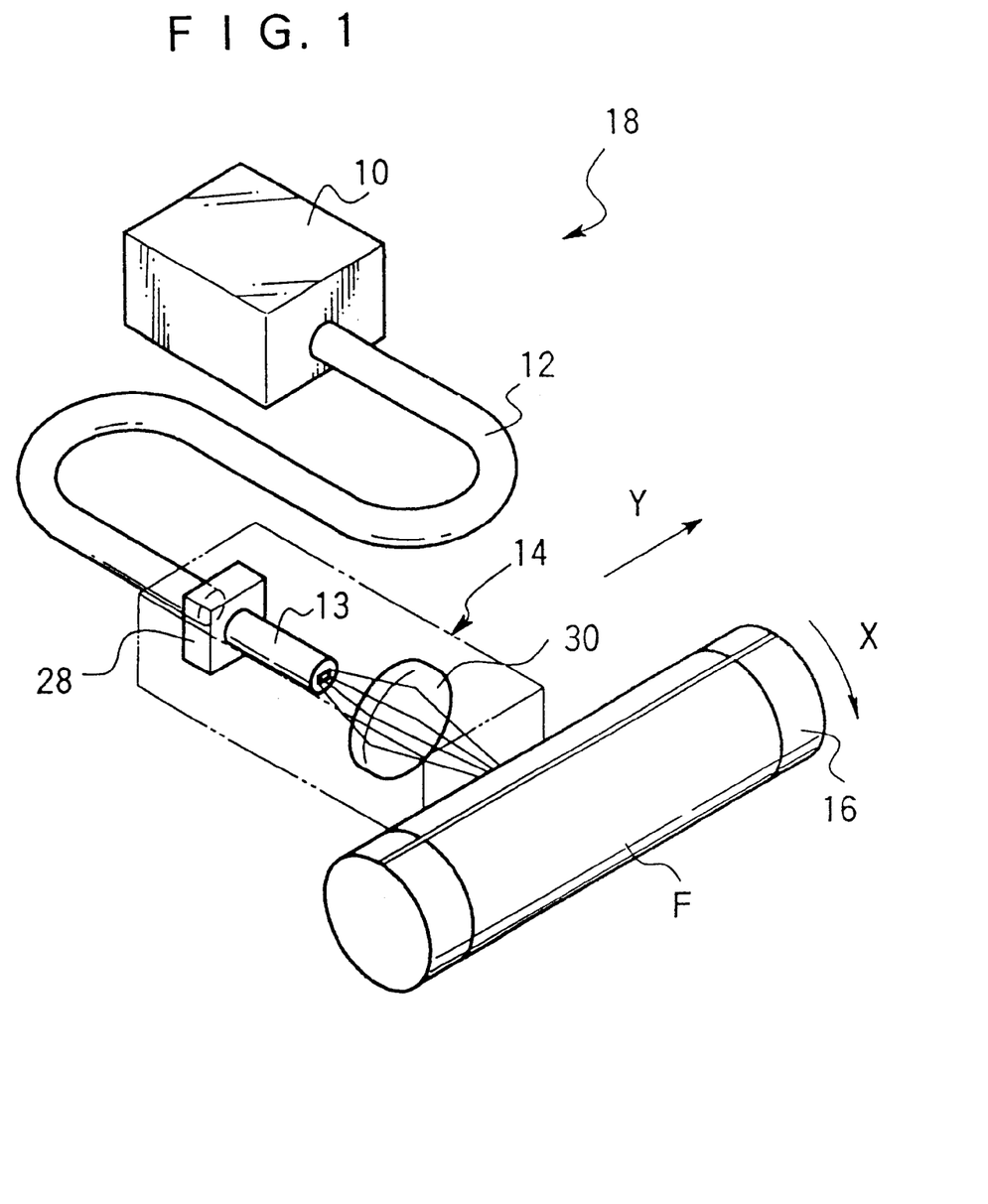
FIG. 1 is a schematic view of a laser recording device relating to a first embodiment of the present invention.
Figure 2:
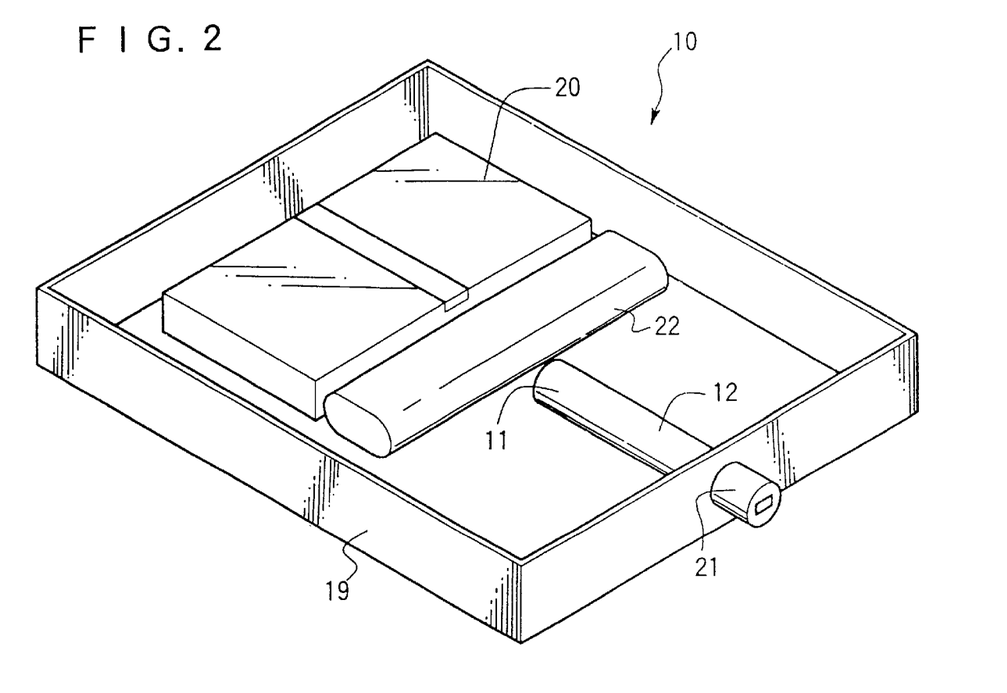
FIG. 2 is a structural view of a semiconductor laser unit of the laser recording device relating to the first embodiment of the present invention.
Figure 3:
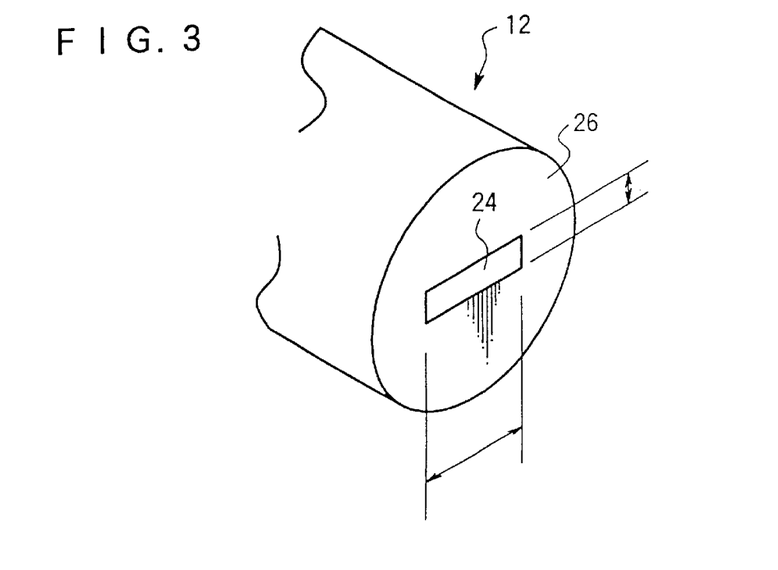
FIG. 3 is a cross-sectional view of an optical fiber used in the laser recording device relating to the first embodiment of the present invention.

A laser recording device 18 is illustrated in FIGS. 1 through 3 as a first embodiment of an image recording device of the present invention. As illustrated in FIG. 1, at the laser recording device 18, a light beam outputted from an exposure head 14 which is connected to a semiconductor laser unit 10 via an optical fiber 12 is illuminated onto a recording film F (recording medium) which is set on a drum 16, such that a surface area modulated image is recorded onto the recording film F. The drum 16 rotates in the direction of arrow X (the main scanning direction). By moving the exposure head 14 in the direction of arrow Y (the subscanning direction), a two-dimensional image is formed on the recording film F. A surface area modulated image is an image formed by on-off controlling the light beam such that a plurality of pixels are formed per predetermined region on the recording film F, and a predetermined gradation is obtained by the surface area occupied by the pixels in the predetermined region.

As illustrated in FIG. 2, the semiconductor laser unit 10 includes a semiconductor laser 20 which outputs a laser beam, and a cylindrical lens 22 which collects the light of the laser beam outputted from the semiconductor laser 20 onto a light entry portion 11 of the optical fiber 12. The semiconductor laser 20 and the cylindrical lens 22 are fixed within a case 19. The optical fiber 12 is inserted in a hole 21 formed in a side wall of the case 19. The light entry portion 11 which is one end of the optical fiber 12 is fixed to the case 19 so as to be adjacent to a side surface of the cylindrical lens 22.

In the present embodiment, a high-output broad-area-type semiconductor laser having an emission region of 50 $\mu$m×10 $\mu$m is used as the semiconductor laser 20.

As illustrated in FIG. 3, the optical fiber 12 includes a rectangular core 24 whose cross-sectional configuration (configuration in a plane orthogonal to the direction of the optical axis of the light beam) is elongated, and a clad 26 which covers (surrounds) the core 24. The cross-sectional configuration of the clad 26 of the optical fiber 12 applied to the present embodiment is circular, and the clad 26 is covered by a covering layer (not illustrated). Specifics of the structure of the optical fiber 12 applied to the present embodiment are as follows.

- core 24: SiO$_2$, refractive index: 1.453, 50 μm×15 μm
- clad 26: ultraviolet curing resin, refractive index: 1.450, outer diameter: 125 μm
- covering layer: ultraviolet curing resin, refractive index: 1.320
- NA (numerical aperture): 0.1

The optical fiber having the core with an elongated, rectangular cross-sectional configuration may be formed as follows. A base material (preform) which has a rectangular configuration and becomes the core is manufactured, and after this base material is wire drawn, the clad layer and the covering layer are formed. Known methods such as those disclosed in U.S. Pat. Nos. 5,373,576 and 5,268,978 may be used to manufacture the optical fiber.

The exposure head 14 includes a holding member 28 for holding a light exit portion 13 which is the other end of the optical fiber 12, and a focusing lens 30 which forms, on the recording film F, a near field pattern image of the light beam outputted from the light exit portion 13.

Next, operation of the image recording device according to the first embodiment will be described.

The laser beam, which is modulated in accordance with image information and is outputted from the semiconductor laser 20, is collected onto the light entry portion 11 of the optical fiber 12 by the cylindrical lens 22, and is transmitted by the optical fiber 12. A light beam, whose cross-sectional configuration is elongated and rectangular, is outputted from the elongated, rectangular core 24 of the light exit portion 13 of the optical fiber 12 held by the holding member 28. The optical fiber 12 is mounted to the exposure head 14 such that the short width direction of the cross-section of the outputted light beam is the main scanning direction (the direction of arrow X). An elongated, rectangular near field pattern image is formed on the recording film F on the drum 16 by the focusing lens 30.

In the present embodiment, as described above, the elongated, rectangular near field pattern image, whose short width direction is the main scanning direction (the direction of arrow X), is formed on the recording film F by the light beam emitted from the optical fiber 12. Because the scanning speed is substantially constant throughout the process, exposure is carried out in a shorter time and at a higher illumination intensity than a case in which a circular near field pattern image is formed on the recording film F. As a result, a photosensitive material exhibiting low intensity reciprocity law failure can be exposed at a low exposure energy.

Figure 11:
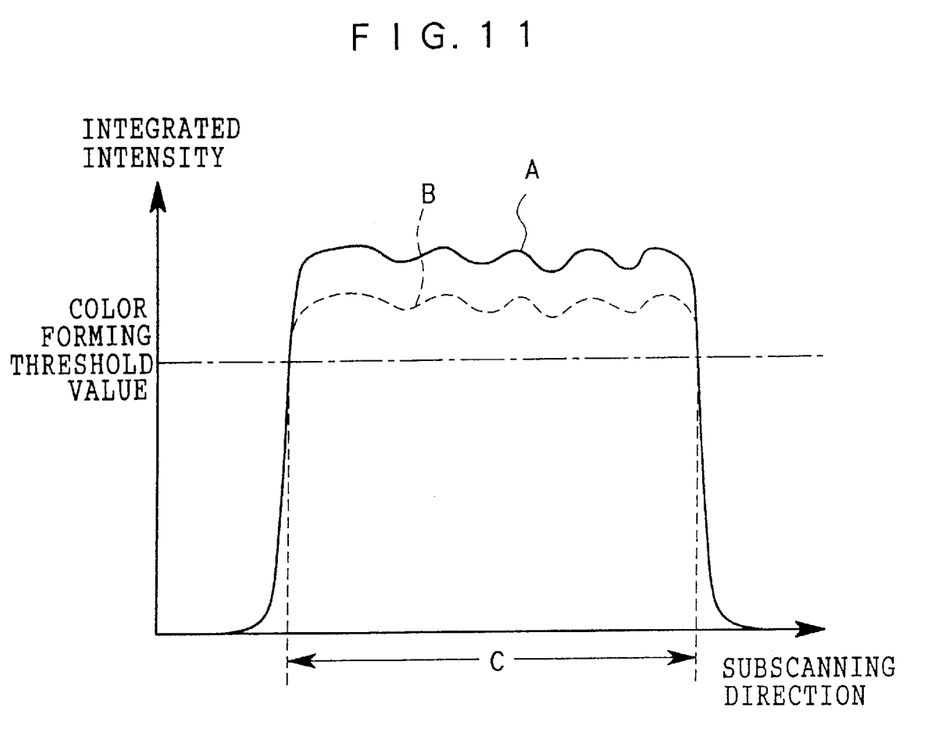
FIG. 11 is a view for explaining an intensity distribution, which is integrated in the subscanning direction, of a laser beam on a recording medium.

Further, in the present embodiment, the subscanning direction distribution of the values of the light beam energy is not a Gaussian distribution, and rather, is a substantially rectangular distribution as illustrated in FIG. 11. As a result, as illustrated in FIG. 11, even if the intensity of the light beam varies, i.e., even if the amount of light varies from A to B, the color forming range C of the recording film F, which is determined by a color forming threshold value, does not vary, and the widths of the subscanning direction written lines of the near field pattern image are maintained constant on the recording film F. Further, when the surface area gradation is expressed by halftone dots, by maintaining the widths of the written lines constant, the halftone dot ratio is maintained constant.

Figure 12:
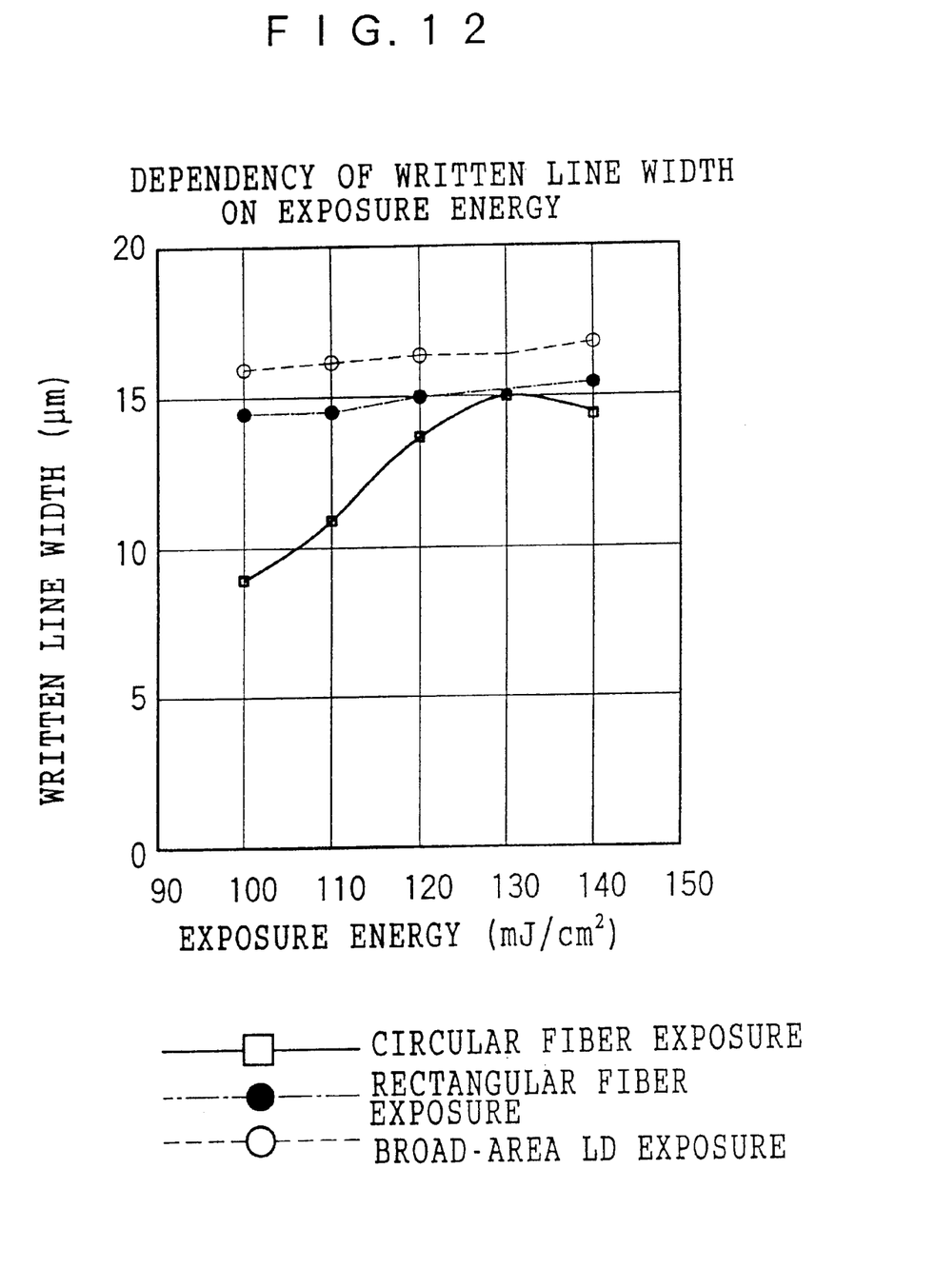
FIG. 12 is a graph showing the dependency, on light amount, of the widths of written lines measured by using the laser recording device relating to the first embodiment of the present invention.
Figure 13A:
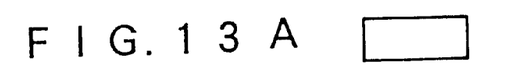
FIGS. 13A through 13G are cross-sectional views illustrating examples of core configurations of optical fibers used in the image recording device of the present invention.
Figure 13B:
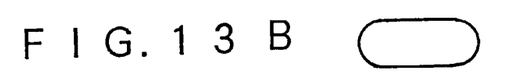
Figure 13C:
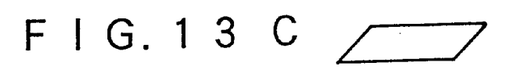
Figure 13D:
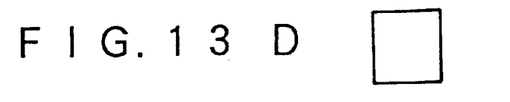
Figure 13E:
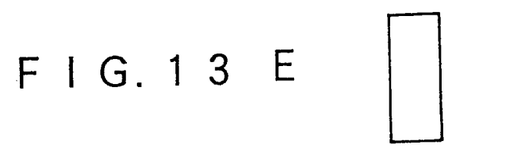
Figure 13F:
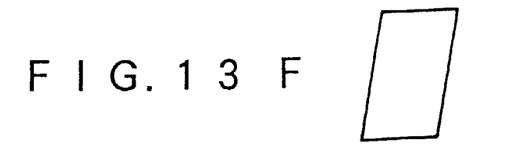
Figure 13G:
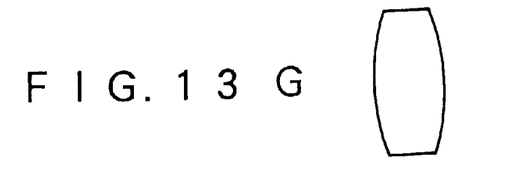

By using the laser recording device of the present embodiment, the widths of the written lines in an exposure energy range of 100 mJ/cm$^2$ to 150 mJ/cm$^2$ were measured. A deposited-film-ablation-type heat-mode photosensitive recording material was used as the recording medium. The results of measurement are shown in FIG. 12. For comparison, the widths of written lines were similarly measured in a case in which, instead of the optical fiber 12, an optical fiber having a core with a circular cross-sectional configuration (clad outer diameter: 125 μm, core inner diameter: 50 μm) was used, and a case in which a near field pattern image was focused directly onto a photosensitive recording material from a broad-area-type semiconductor laser (output region 50 μm×1 μm) without using an optical fiber. These results of measurement are also shown in FIG. 12.

As can be seen from FIG. 12, when the optical fiber having a core with a circular cross-sectional configuration was used, the widths of the written lines recorded on the photosensitive recording material varied due to fluctuations in the exposure energy. When recording was carried out by the laser recording device of the present embodiment using the optical fiber having the core with the rectangular cross-sectional configuration, the widths of the written lines were maintained constant, in the same way as the case in which the near field pattern image was focused directly on the photosensitive recording material from a broad-area-type semiconductor laser without using an optical fiber.

As described above, in the present embodiment, the cross-sectional configuration of the core of the optical fiber is an elongated configuration. Therefore, a beam spot which has a configuration which extends in an elongated manner in the subscanning direction can be formed on the recording material, and the scanning time can be shortened.

Further, the cross-sectional configuration of the core of the optical fiber is a configuration having two parallel sides, such as a rectangle. Therefore, a near field pattern image can be focused on a recording medium with the configuration of the subscanning direction distribution of the values of the light beam energy being substantially rectangular, and not being a Gaussian distribution. The intensity of the light of beam is substantially constant in the widthwise direction. Therefore, even if the light amount or the sensitivity of the recording material or the like varies, there is little variation in the widths of the written lines and in the halftone dot ratio. A good, stable image can therefore be obtained.

Second Embodiment

Figure 4:
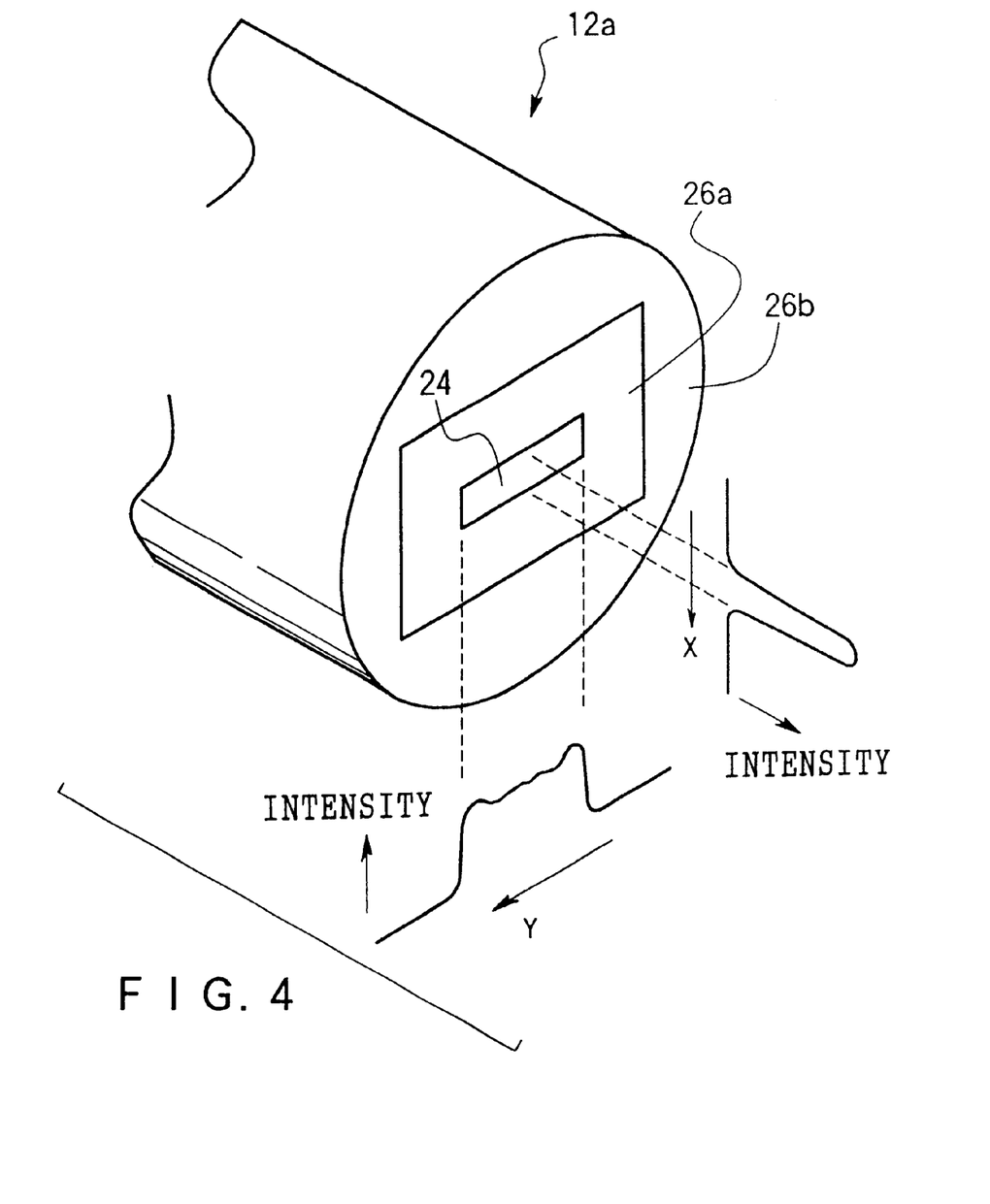
FIG. 4 is a view for explanation of a laser beam configuration of an optical fiber used in a laser recording device relating to a second embodiment of the present invention.

Next, a second embodiment of the present invention will be described. The image recording device relating to the present second embodiment is structured similarly to that of the first embodiment except for the following: in the present second embodiment, as illustrated in FIG. 4, instead of the optical fiber 12, an optical fiber 12a is used. The optical fiber 12a is formed by a core whose cross-sectional configuration is a rectangular slit shape (an elongated, rectangular shape) and a clad covering the core. The optical fiber 12a emits a light beam whose main scanning direction light intensity distribution has a single mode. Accordingly, description of the structures of the present second embodiment other than the optical fiber 12a will be omitted.

As illustrated in FIG. 4, the optical fiber 12a is formed by a core 24a whose cross-sectional configuration is an elongated, rectangular shape, a first clad 26a whose cross-sectional configuration is rectangular and which covers the core 24a, and a second clad 26b whose cross-sectional configuration is circular and which covers the first clad 26a.

Specifics of the structure of the optical fiber 12*a* applied to the present embodiment are as follows.

core 24*a*: $GeO_2$—$SiO_2$, refractive index: 1.456, 12 $\mu$m×4 $\mu$m clad 26*a*: $SiO_2$, refractive index: 1.453, 50 $\mu$m×15 $\mu$m clad 26*b*: ultraviolet curing resin, refractive index: 1.320, outer diameter: 125 $\mu$m NA (numerical aperture): 0.1

By finely controlling the refractive indices and cross-sectional configurations of the core and the clads as described above, the optical fiber 12*a* is obtained which emits a light beam whose light intensity distribution in one direction among the directions orthogonal to the direction of the optical axis exhibits a single-mode.

The optical fiber having the core with the elongated, rectangular cross-section and the rectangular first clad may be formed as follows. A base material (preform) which has a rectangular configuration and becomes the core and the first clad is manufactured, and after this base material is wire drawn, the second clad layer is formed. Known methods such as those disclosed in U.S. Pat. Nos. 5,373,576 and 5,268,978 may be used to manufacture the optical fiber.

The emitted light pattern of the light beam outputted from the optical fiber 12*a* when the optical fiber 12*a* and the semiconductor laser 20 are joined (e.g., the emitted light pattern of the light beam emitted from the optical fiber 12*a* when the optical fiber 12*a* and the semiconductor laser 20 are joined such that the main scanning direction light intensity distribution is a single-mode distribution) is as follows: as shown in FIG. 4, the configuration in the subscanning direction is a substantially square configuration having a wide-width, and the configuration in the main scanning direction is a narrow-width configuration having a single peak. Given that the overall width in the main scanning direction is $1/e^2$, the emitted light size and spread angle of the emitted light are as follows:

emitted light size: subscanning direction: 15 $\mu$m; main scanning direction: 7.6 $\mu$m spread angle of emitted light: subscanning direction: 8°; main scanning direction: 16°

The polarization direction of the emitted light was the same as the polarization direction of the semiconductor laser.

Figure 5:
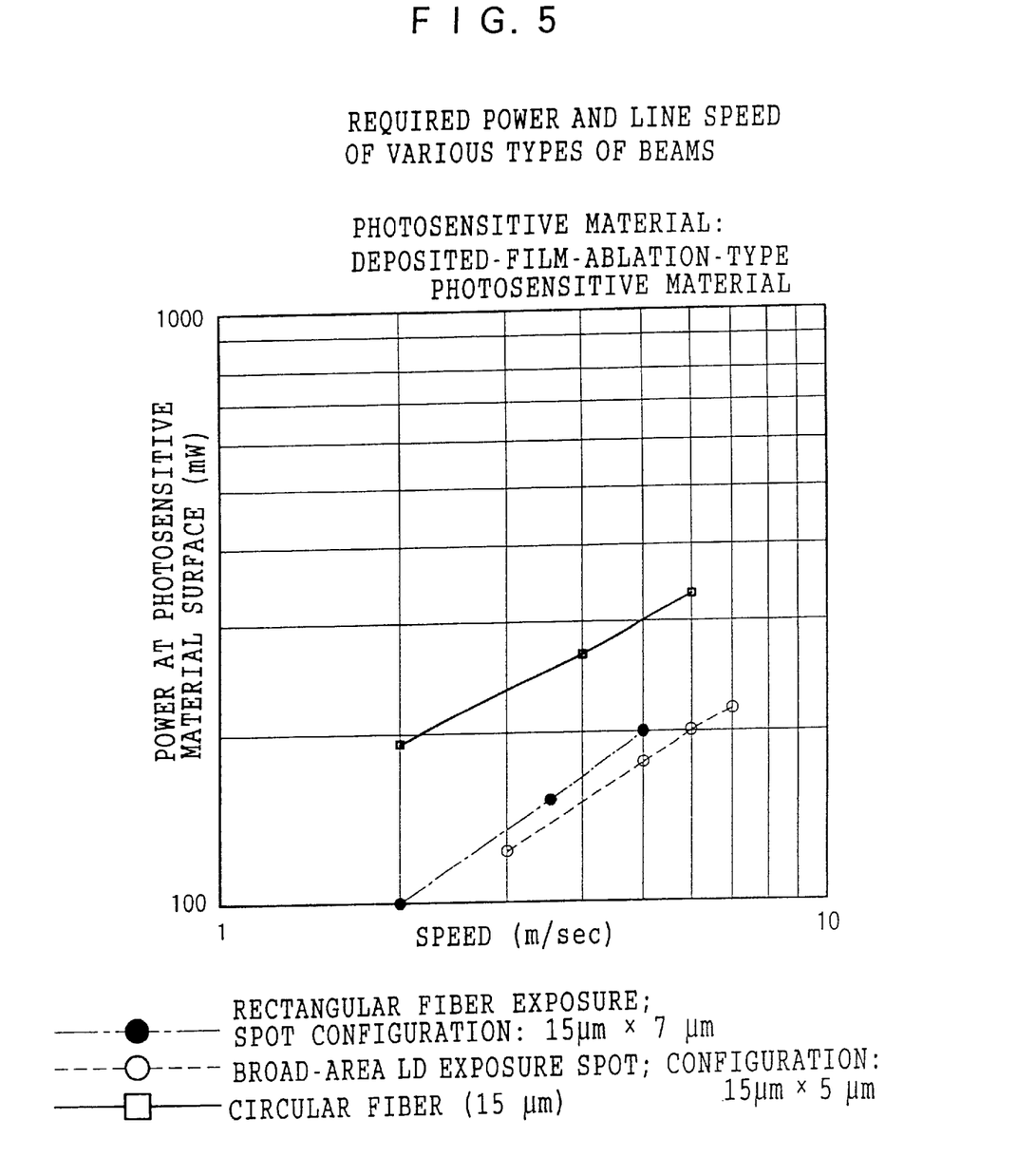
FIG. 5 is a graph illustrating laser power necessary for exposure, which is measured by using the laser recording device relating to the second embodiment of the present invention.

Using the laser recording device of the present embodiment, the laser power necessary for exposure was measured while varying the main scanning speed from 2 m/sec to 7 m/sec. A deposited-film-ablation-type heat-mode photosensitive recording material was used as the recording medium. The results of measurement are illustrated in FIG. 5. For comparison, the laser powers necessary for exposure were similarly measured in a case in which, instead of the optical fiber 12*a*, an optical fiber having a core with a circular cross-sectional configuration (clad outer diameter: 125 $\mu$m, core inner diameter: 50 $\mu$m) was used, and a case in which a near field pattern image was focused directly onto a photosensitive recording material from a broad-area-type semiconductor laser (output region 50 $\mu$m×1 $\mu$m) without using an optical fiber. These results of measurement are also shown in FIG. 5.

A heat-mode photosensitive recording material is a photosensitive recording material on which an image is recorded by causing physical changes or chemical changes by photothermal conversion after exposure. When the main scanning speed is increased, the heat generated on the photosensitive recording material is dispersed so that the phenomenon known as low intensity reciprocity law failure, for which a higher amount of exposure energy is required, is exhibited. However, as can be seen from FIG. 5, by using the laser recording device of the present second embodiment which uses the optical fiber having the core whose cross-sectional configuration is elongated and rectangular, when recording on such a heat-mode photosensitive recording material, in the same way as a case in which a near field pattern image is directly focused and recorded from a broad-area-type semiconductor laser without using the optical fiber, the main scanning speed can be increased and exposure can be carried out at a laser power which is half of the laser power in a case in which exposure is carried out by using an optical fiber having a core whose cross-sectional configuration is circular.

As described above, in the image recording device relating to the present second embodiment as well, in the same way as with the image recording device of the first embodiment, a beam spot, whose configuration extends in an elongated manner in the subscanning direction, can be obtained on the recording material, and the scanning time can be shortened (the main scanning speed can be increased). In this way, an image can be obtained on a heat-mode-type photosensitive recording material, which exhibits low intensity reciprocity law failure, by using a lower exposure energy than in a case in which an optical fiber having a core with a circular cross-sectional configuration is used.

Further, in the same way as the image recording device of the first embodiment, a near field pattern image can be focused on a recording medium with the configuration of the subscanning direction distribution of the values of the light beam energy integrated in the main scanning direction (i.e., the integrated intensities) being substantially rectangular and not being a Gaussian distribution. Even if the light amount or the sensitivity of the recording material or the like is varied, a good, stable, image can be obtained. Further, the spot diameter in the main scanning direction is easy to control by using an optical fiber which emits a light beam having a single-mode main scanning direction light intensity distribution.

In the first embodiment and the second embodiment, the optical fibers 12 and 12*a* which are each formed from a single fiber are used. However, a structure may be used in which two or more fibers are connected by a joining member such as a fitting connector or the like. By using such a joining member, disconnection of the semiconductor laser unit 10 and the exposure head 14 is easy, which facilitates replacement when the semiconductor laser malfunctions.

Figure 6A:
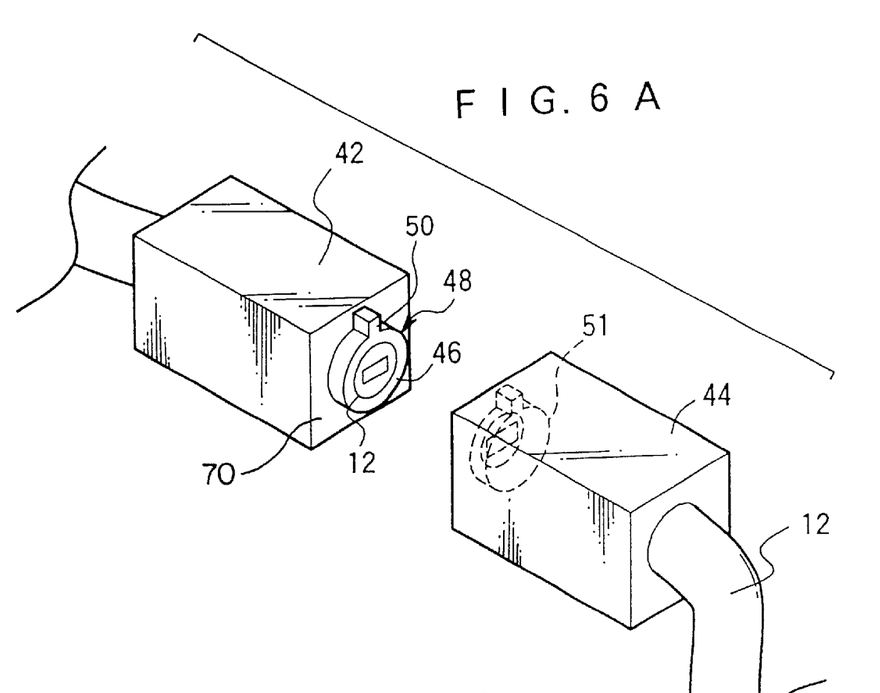
FIG. 6A is a schematic view of a connector used in the laser recording device of the present invention, and illustrates a state before fitting.
Figure 6B:
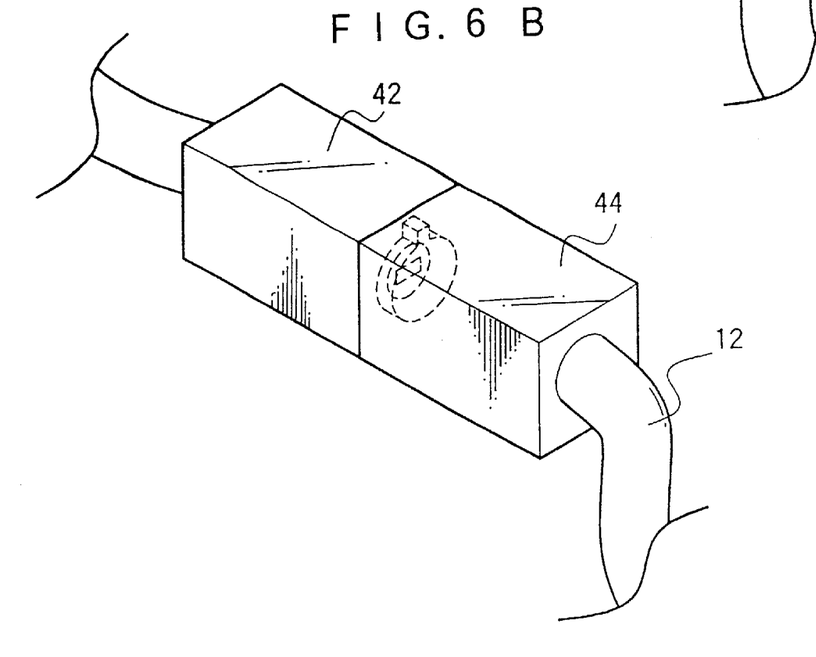
FIG. 6B is a schematic view of a connector used in the laser recording device of the present invention, and illustrates a state after fitting.

A connector 40 illustrated in FIGS. 6A and 6B is preferably used as the fitting connector. FIG. 6A illustrates a state before fitting together, and FIG. 6B illustrates a state after fitting together.

As illustrated in FIGS. 6A and 6B, the connector 40 is formed by a convex side terminal 42 and a concave side terminal 44. The periphery of the clad 26 of the optical fiber 12 is covered by a protecting member 46. At the convex side terminal 42, the protecting member 46 and the optical fiber 12 are held such that a convex portion 48 is formed with respect to the joined surfaces 70 of the convex side terminal 42 and the concave side terminal 44. A protrusion 50, which serves as a positioning means at the periphery of the optical fiber 12, is provided at the outer peripheral portion of the convex portion 48. A concave portion 51, which fits together with the convex portion 48, is formed at the concave side terminal 44. The optical fiber 12 covered by the protecting member 46 is held in the far recessed portion of the concave portion 51. Due to the protrusion 50 which is provided as the positioning means, the fitting connector 40 makes the core of the optical fiber 12 of the convex side terminal 42 and the core of the optical fiber 12 of the concave side terminal 44 match one another at joining surfaces thereof, so as to connect the optical fibers. Loss of light can be suppressed due to this connection.

Third Embodiment

Hereinafter, a third embodiment of the present invention will be described. Structural portions which are the same as those of the image recording device of the first embodiment are designated by the same reference numerals, and description thereof is omitted.

The feature of the image recording device of the present third embodiment is that multibeam exposure, in which plural lines can be recorded by a single main scan, is possible.

Figure 7:
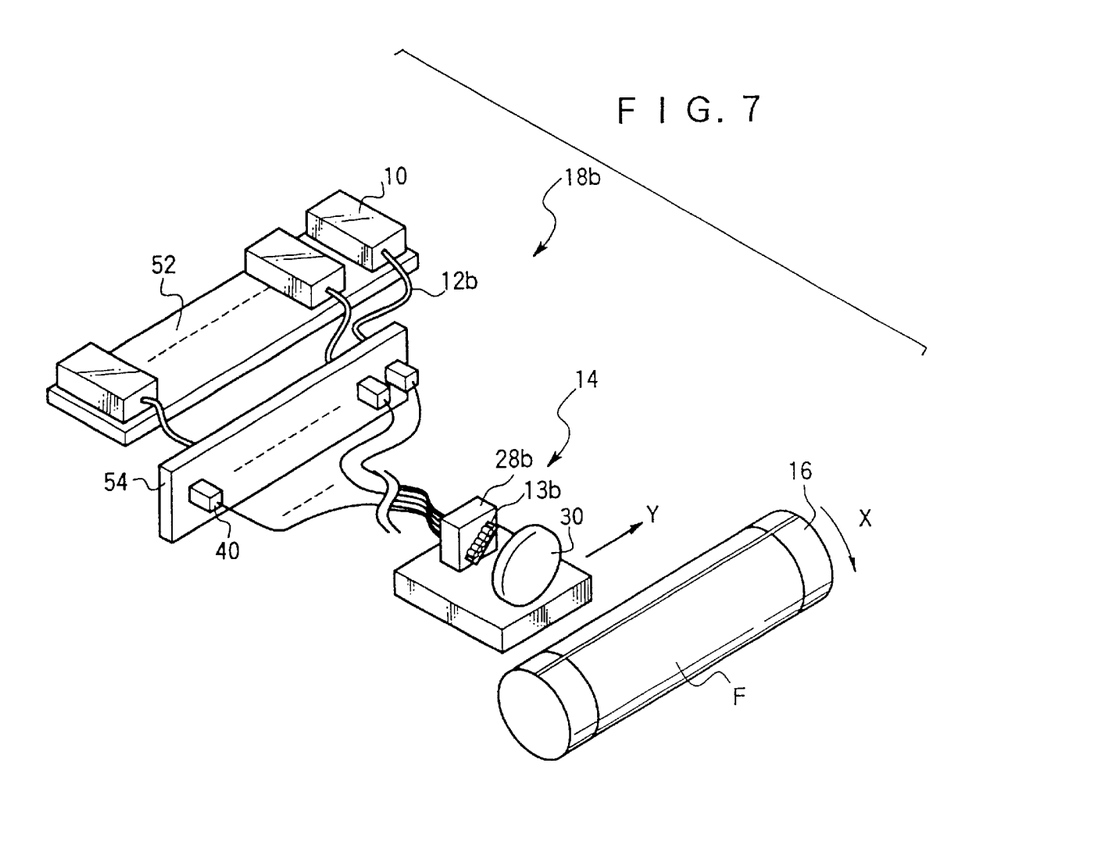
FIG. 7 is a schematic view of a laser recording device relating to a third embodiment of the present invention.

As illustrated in FIG. 7, in a laser recording device 18b, a plurality of the semiconductor laser units 10 are connected to the exposure head 14 via a plurality of optical fibers 12b. The light beam outputted from the exposure head 14 is illuminated onto the recording film F (recording medium) set on the drum 16, so as to record a surface area modulated image on the recording film F.

The plurality of semiconductor laser units 10 are disposed at intervals on a heat sink 52. A fitting connector 40 is provided at each of the optical fibers 12b, such that the semiconductor laser units 10 and the exposure head 14 are disconnectably connected. The fitting connectors 40 are held in an array at a holding member 54.

Figure 8:
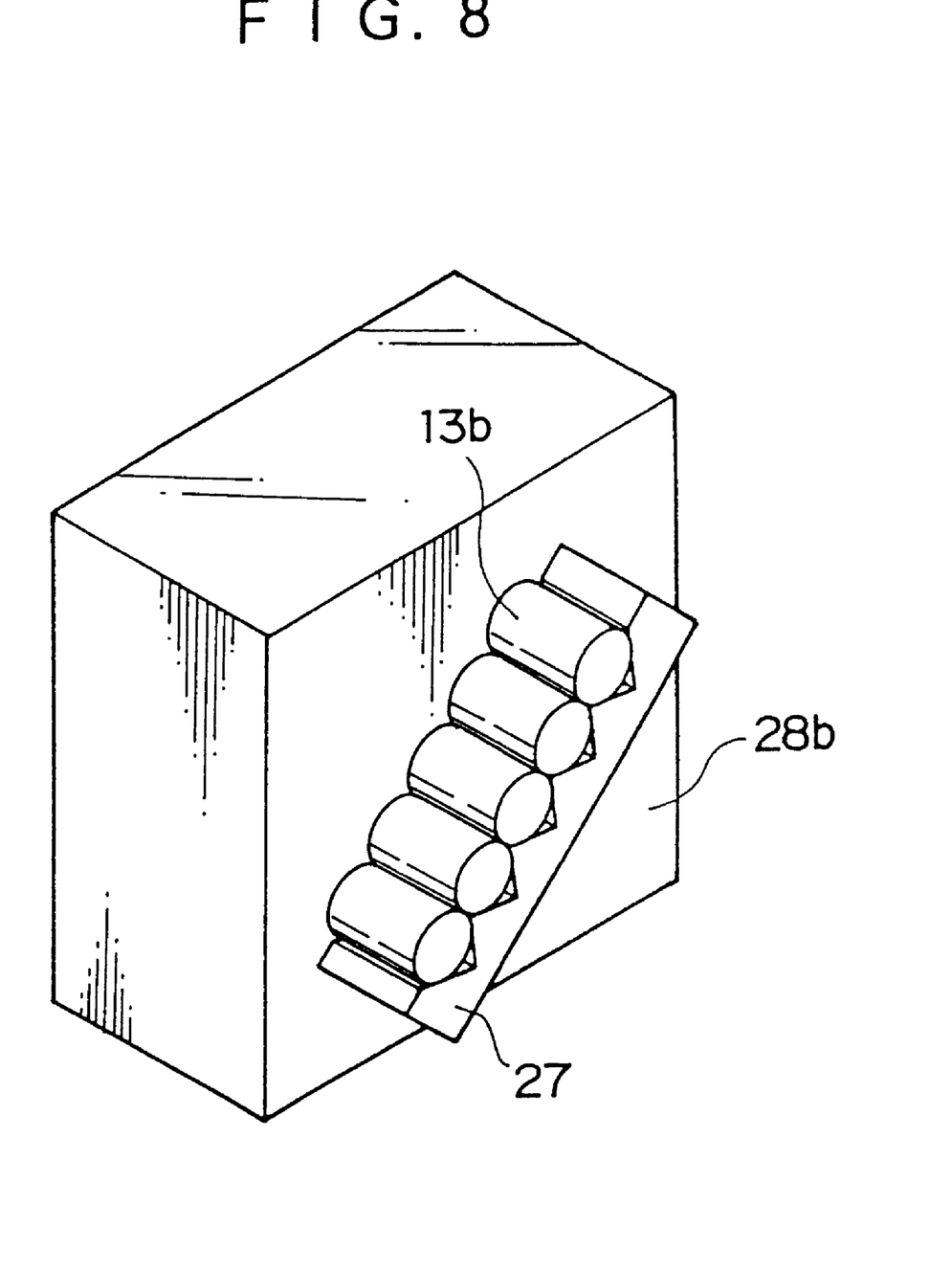
FIG. 8 is an enlarged view illustrating the structure of a V-shaped groove member of the laser recording device relating to the third embodiment of the present invention.

As shown in FIG. 8, the exposure head 14 includes a V-shaped groove member 27, a holding member 28b and a focusing lens 30. The V-shaped groove member 27 holds light exit portions 13b of the plural optical fibers 12b. The holding member 28b holds the V-shaped groove member 27. The focusing lens 30 forms on the recording film F a near field pattern image of the light beams outputted from the optical fibers 12b.

Figure 9A:
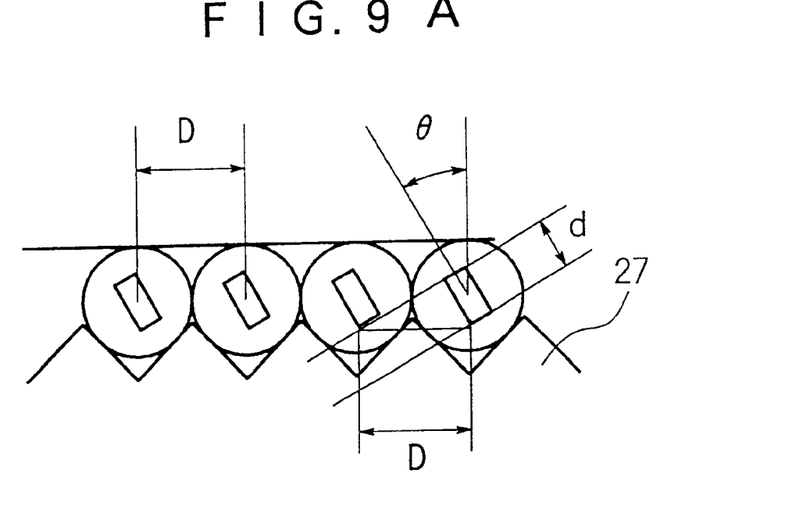
FIGS. 9A and 9B are views illustrating the arrangement of an optical fiber array of the laser recording device relating to the third embodiment of the present invention.
Figure 9B:
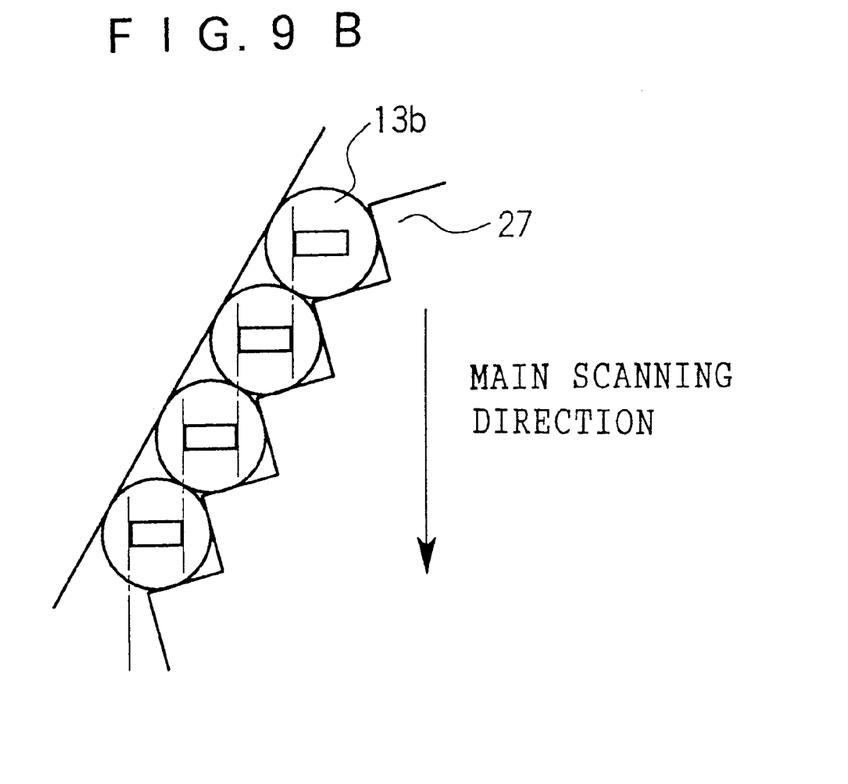
Figure 10A:
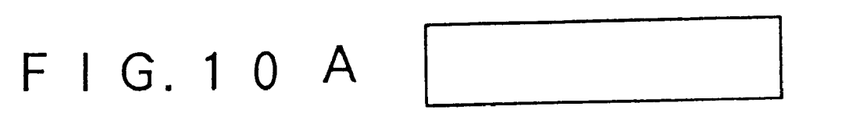
FIGS. 10A through 10H are cross-sectional views illustrating examples of core configurations of optical fibers used in an image recording device of the present invention.
Figure 10B:
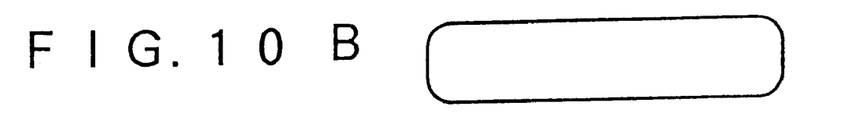
Figure 10C:
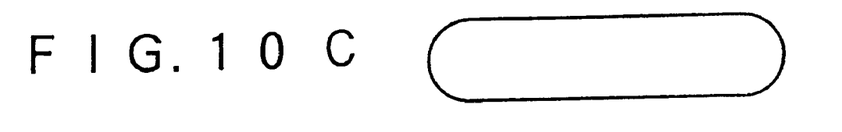
Figure 10D:
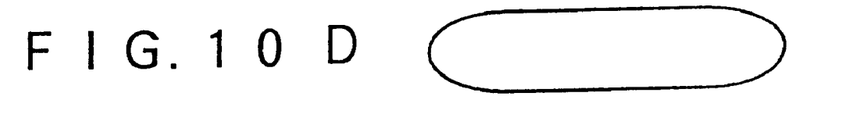
Figure 10E:
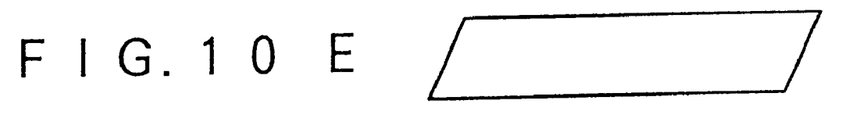
Figure 10F:
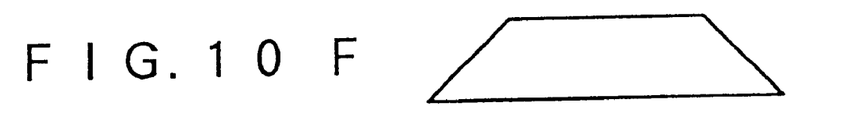
Figure 10G:
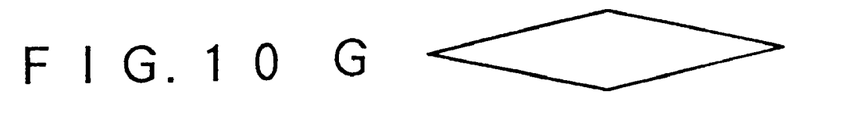
Figure 10H:
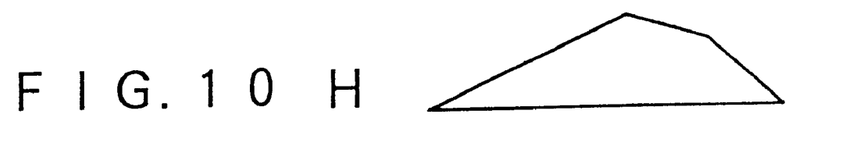

As illustrated in FIGS. 9A and 9B, the light exit portions 13b of the plural optical fibers 12b are held in the respective grooves of the V-shaped groove member 27 such that the positions, in the focal point direction, of the light exit end surfaces of the light exit portions 13b are the same, and such that the directions of the short sides of the cores of the light exit portions 13b coincide with the main scanning direction, and such that, for any given two adjacent light exit portions 13b, the short side of the core of one light exit portion 13b is positioned on an imaginary extended line of the short side of the core of the adjacent light exit portion 13b. Here, given that the distance between the central axes of the optical fibers is D, the length of the long side of the core is d, and the inclination of the long side of the core with respect to a direction orthogonal to the holding surface (longitudinal surface) of the V-shaped groove member 27 (i.e., the inclination in the main scanning direction with respect to the holding surface of the V-shaped groove member 27) is θ, the relationship sin θ=d/D is established.

In FIGS. 9A and 9B, sin θ=d/D. However, if scanning is carried out by using an optical fiber array in which adjacent cores are disposed without intervals therebetween, there are no particular constraints provided that beam spots can be obtained in which there are no gaps therebetween in the subscanning direction. In this case, the value of sin θ may be less than or equal to d/D.

As described above, in the image recording device relating to the present third embodiment, in the same way as the image recording device of the first embodiment, a beam spot, whose configuration in the subscanning direction extends in an elongated manner, can be obtained on the recording material, and the scanning time can be shortened. In this way, an image can be obtained on a heat-mode type photosensitive recording material, which exhibits low intensity reciprocity failure, by an amount of exposure energy which is less than a case in which an optical fiber having a core with a circular cross-sectional configuration is used.

Further, in the same way as the image recording device of the first embodiment, a near field pattern image can be focused on the recording medium such that the subscanning direction distribution of the values of the light beam energy integrated in the main scanning direction (i.e., the integrated intensities) is not a Gaussian distribution, and rather, is a substantially rectangular distribution. Even if the light amount or the sensitivity of the recording material or the like is varied, a good, stable, image can be obtained. Further, the spot diameter in the main scanning direction is easy to control by using an optical fiber which emits a light beam having a single-mode main scanning direction light intensity distribution.

A plurality of lines can be recorded in a single main scan, and the image forming speed can be increased. Further, the light sources are optically joined to the recording head or the like by optical fibers whose lengths can be adjusted. Thus, the light sources can be disposed at a distance from the recording head, which facilitates cooling of the light sources. Further, by arranging the plural optical fibers such that there are no gaps between the beam spots on the recording medium, the configurations of the pixels can be adjusted such that a better image can be obtained.

In the above-described first through third embodiments, the optical fiber is used which has the core which is formed such that the cross-sectional configuration in the direction substantially orthogonal to the axis of the light beam is elongated and rectangular along the entire length thereof. However, the optical fiber is not limited to the same. Even if the cross-sectional configuration of the core is not rectangular, an elongated configuration suffices, such as an elongated oval core cross-sectional configuration or an elongated rhomboid core cross-sectional configuration, such as the configurations illustrated in FIGS. 10A through 10H. Further, even if the cross-sectional configuration of the core is not rectangular, a configuration having two parallel sides, such as a square core cross-sectional configuration or an elongated circular core cross-sectional configuration, such as the configurations illustrated in FIGS. 13A through 13G. Moreover, it suffices that at least the light entry portion and the light exit portion are formed in an elongated configuration, and the intermediate portion between the light entry portion and the light exit portion may have a core cross-sectional configuration which is circular or the like.

In the first through third embodiments, a high-output, broad-area-type semiconductor laser is used as the light source. However, a regular semiconductor laser whose emitted light profile is circular may be used.

In the first and second embodiments, the recording material is the deposited-film-ablation-type heat-mode photosensitive recording material. However, the photosensitive material is not particularly limited provided that it is a photosensitive material which exhibits low intensity reciprocity failure during the time period corresponding to a pixel exposure time during laser exposure. Moreover, the photosensitive recording material is not particularly limited provided that it can be scan-exposed by a laser beam.

Diazo-based photosensitive materials, silver halide photosensitive materials, photopolymerizable photosensitive materials and the like may be used as the photosensitive recording material in the present invention.

Further, the heat-mode photosensitive recording material is not limited to an ablation-type, and a heat-mode photosensitive recording material utilizing thermal modification such as phase transition or insolubility may be used.

What is claimed is:

1. An image recording device for recording an image on a recording medium by main scanning and subscanning a light beam with respect to the recording medium by relatively moving the light beam and the recording medium, comprising:

a light source which emits a laser beam which has been modulated in accordance with image data;

an optical fiber having an innermost core, a clad covering the core, a light exit portion, and a light entry portion optically joined to the light source, which receives the laser beam into the optical fiber, the core having a cross-sectional configuration in a plane substantially orthogonal to an optical axis direction of the laser beam corresponding to at least one of an elongated configuration and a configuration having two parallel sides at least at the light exit portion of said optical fiber; and a focusing lens which focuses, on the recording medium, a light beam emitted from the light exit portion of said optical fiber.

2. The image recording device of claim 1, wherein said focusing lens focuses the laser beam on the recording medium such that a configuration of the laser beam on the recording medium is the elongated configuration and the elongated configuration includes a short dimension oriented in a direction coinciding with a direction in which the main scanning is conducted.

3. The image recording device of claim 1, wherein the cross-section of said core is the elongated configuration and the elongated configuration includes a short dimension oriented in a direction coinciding with a direction in which the main scanning is conducted.

4. The image recording device of claim 1, wherein the cross-section of said core is configuration having two parallel sides, and said focusing lens focuses the laser beam on the recording medium such that a light intensity of the light beam emitted from the light exit portion of said optical fiber is substantially same at least one of in a direction in which the main scanning is conducted and in a direction in which the sub scanning is conducted.

5. The image recording device of claim 1, wherein the recording medium is a heat-mode-type photosensitive recording material.

6. The image recording device of claim 1, wherein said light source is a broad-area-type semiconductor laser.

7. The image recording device of claim 1, wherein an exit light beam emitted from the light exit portion of said optical fiber having a light intensity distribution in a direction in which the main scanning is conducted is a single-mode distribution.

8. The image recording device of claim 1, wherein said optical fiber is formed from at least two optical fibers, and said at least two optical fibers are disconnectably joined by a joining member which is provided with positioning means at peripheries of said optical fibers for positioning the optical fibers relative to one another according to a predefined orientation.

9. An optical fiber for transmitting a light beam, comprising:

an innermost core having a light entry portion for receiving a light beam therein a light exit portion and a cross-sectional configuration in a plane substantially orthogonal to an optical axis direction of the light beam being at least one of an elongated configuration and a configuration having two parallel sides at least at the light exit portion; and a clad covering said core.

10. The optical fiber of claim 9, wherein an exit light beam emitted from the light exit portion of said optical fiber having a light intensity distribution in one of directions substantially orthogonal to the optical axis direction is a single-mode distribution.

11. An image recording device which records an image on a recording medium by main scanning and subscanning a light beam with respect to the recording medium by relatively moving the light beam and the recording medium, and in which a plurality of light beams are main scanned in a single main scan, comprising:

a plurality of light sources emitting light beams which have been modulated in accordance with image data;

an optical fiber array in which a plurality of optical fibers are aligned in an array form such that positions of said optical fibers in a focal point direction are the same, each of said optical fibers including a light entry portion, a light exit portion, and a core, the core having a cross-sectional configuration in a plane substantially orthogonal to an optical axis direction of each of the light beams corresponding to at least one of an elongated configuration and a configuration having two parallel sides at least at the light exit portion of said optical fiber, and each said optical fiber including a clad covering each the core, said plurality of optical fibers being optically joined to said light source; and a focusing lens which focuses, on the recording medium, light beams emitted from the light exit portions of said optical fibers.

12. The image recording device of claim 11, wherein said focusing lens focuses the laser beam on the recording medium such that a configuration of the laser beam on the recording medium is the elongated configuration and the elongated configuration includes a short dimension oriented in a direction coinciding with a direction in which the main scanning is conducted.

13. The image recording device of claim 11, wherein the cross-section of said core is the elongated configuration and the elongated configuration includes a short dimension oriented in a direction coinciding with a direction in which the main scanning is conducted.

14. The image recording device of claim 11, wherein the cross-section of said core is configuration having two parallel sides, and said focusing lens focuses the laser beam on the recording medium such that a light intensity of the light beam emitted from the light exit portion of said optical fiber is substantially same at least one of in a direction in which the main scanning is conducted and in a direction in which the sub scanning is conducted.

15. The image recording device of claim 11, wherein said plurality of optical fibers are aligned such that no intervals are formed between focused images on the recording material.

* * * * *